United States Patent
Fritz

(10) Patent No.: US 10,815,644 B2
(45) Date of Patent: Oct. 27, 2020

(54) TIRE SIZE CALIBRATION AND CONTROL SYSTEM

(71) Applicant: Deere & Company, Moline, IL (US)

(72) Inventor: Justin E. Fritz, Sherrill, IA (US)

(73) Assignee: Deere & Company, Moline, IL (US)

( * ) Notice: Subject to any disclaimer, the term of this patent is extended or adjusted under 35 U.S.C. 154(b) by 85 days.

(21) Appl. No.: 16/135,892

(22) Filed: Sep. 19, 2018

(65) Prior Publication Data

US 2020/0087889 A1    Mar. 19, 2020

(51) Int. Cl.

| | | |
|---|---|---|
| *E02F 9/20* | (2006.01) | |
| *E02F 9/26* | (2006.01) | |
| *B60C 11/24* | (2006.01) | |
| *G01M 17/02* | (2006.01) | |
| *B60W 40/105* | (2012.01) | |
| *B60C 23/06* | (2006.01) | |

(52) U.S. Cl.
CPC .......... *E02F 9/2029* (2013.01); *B60C 11/246* (2013.01); *E02F 9/264* (2013.01); *B60C 23/061* (2013.01); *B60W 40/105* (2013.01); *G01M 17/02* (2013.01)

(58) Field of Classification Search
CPC ...... E02F 9/2029; E02F 9/264; B60C 11/246; B60C 23/061; B60W 40/105; G01M 17/02
See application file for complete search history.

(56) References Cited

U.S. PATENT DOCUMENTS

| | | | |
|---|---|---|---|
| 5,699,251 A | 12/1997 | Mori et al. | |
| 5,771,479 A | 6/1998 | Yamamoto et al. | |
| 8,306,699 B2 | 11/2012 | Scheer | |
| 8,577,540 B2 | 11/2013 | Wada | |
| 9,008,903 B2 | 4/2015 | Kurata et al. | |
| 9,038,289 B2 | 5/2015 | Kelly | |
| 2015/0336609 A1* | 11/2015 | Smith | B60K 17/356 |
| | | | 701/41 |
| 2017/0106792 A1 | 4/2017 | McKee et al. | |

FOREIGN PATENT DOCUMENTS

DE    102016106383 A1    10/2017

* cited by examiner

*Primary Examiner* — Yuen Wong
(74) *Attorney, Agent, or Firm* — Joseph R. Kelly; Kelly, Holt & Christenson, PLLC

(57) ABSTRACT

A mobile machine includes a plurality of ground-engaging elements that each include a tire, and a plurality of motors, one motor coupled to each of the plurality of ground-engaging elements configured to drive movement of the plurality of ground-engaging elements. The mobile machine also includes a speed sensor coupled to each motor configured to generate speed signals indicative of an operating speed of each motor. The mobile machine includes a tire calibration system configured to receive the speed signals from each speed sensor and to identify a tire size differential across the plurality of ground-engaging elements based on the speed signals. The mobile machine includes a control system configured to generate a separate control signal for each of the plurality of motors based on the tire size differential.

20 Claims, 5 Drawing Sheets

TIRE SIZE CALIBRATION AND CONTROL SYSTEM

FIELD OF THE DESCRIPTION

The present description relates to a calibration system for a mobile machine. More specifically, the present description relates to a tire calibration system for a mobile machine that determines various tire sizes on the mobile machine and generates control signals based on the tire sizes.

BACKGROUND

There are many different types of work machines. Some such work machines include agricultural machines, construction machines, forestry machines, turf management machines, among others. Many of these pieces of mobile equipment have mechanisms that are controlled by the operator in performing operations. For instance, a construction machine can have multiple different mechanical, electrical, hydraulic, pneumatic and electro-mechanical subsystems, among others, all of which can be operated by the operator.

Construction machines are often tasked with transporting material across a worksite, or into or out of a worksite, in accordance with a worksite operation. Different worksite operations may include moving material from one location to another or leveling a worksite, etc. During a worksite operation, a variety of construction machines may be used, including articulated dump trucks, wheel loaders, graders, and excavators, among others. Worksite operations may involve a large number of steps or phases and may be quite complex.

In addition, construction machines often include one or more traction elements (e.g., wheels) that allow the construction machine to move throughout a worksite. In some examples, each traction element may be driven by a singular motor coupled to the particular traction element. A wheel loader, for example, can include individual motors, one motor configured to drive each respective wheel on the wheel loader.

There are scenarios where the tires may not all be the same size. For instance, some operators run used tires on the rear of the machine and newer tires on the front. Similarly, normal wear can cause differences in tire sizes, as can the use of chains, etc.

The discussion above is merely provided for general background information and is not intended to be used as an aid in determining the scope of the claimed subject matter.

SUMMARY

A mobile machine includes a plurality of ground-engaging elements that each include a tire, and a plurality of motors, one motor coupled to each of the plurality of ground-engaging elements configured to drive movement of the plurality of ground-engaging elements. The mobile machine also includes a speed sensor coupled to each motor configured to generate speed signals indicative of an operating speed of each motor. The mobile machine includes a tire calibration system configured to receive the speed signals from each speed sensor and to identify a tire size differential across the plurality of ground-engaging elements based on the speed signals. The mobile machine includes a control system configured to generate a separate control signal for each of the plurality of motors based on the tire size differential.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

During operation of a mobile machine, one or more tires may be replaced on the mobile machine due to wear, a puncture, tread depth, etc. Similarly, in order to save on replacement costs, operators may run more worn tires on the rear of the machine and less worn tires on the front. This may result in the tires having different sizes from one another. Each of the tires may be driven by a separate motor. Currently, control signals that control the speed of the different motors coupled to the tires do not take into account a tire size differential. As a result, the control signals for the one or more motors may be attempting to drive the wheels at the wrong speed, which can lead to an inefficiency or ineffectiveness in driving the tires on the mobile machine.

The present description proceeds with respect to a tire calibration system that determines and, takes into account, a tire size differential in controlling a mobile machine. In one example, this includes generating control signals for one or more motors that are configured to drive movement of ground-engaging elements (e.g., wheels) on the mobile machine.

Figure 1:
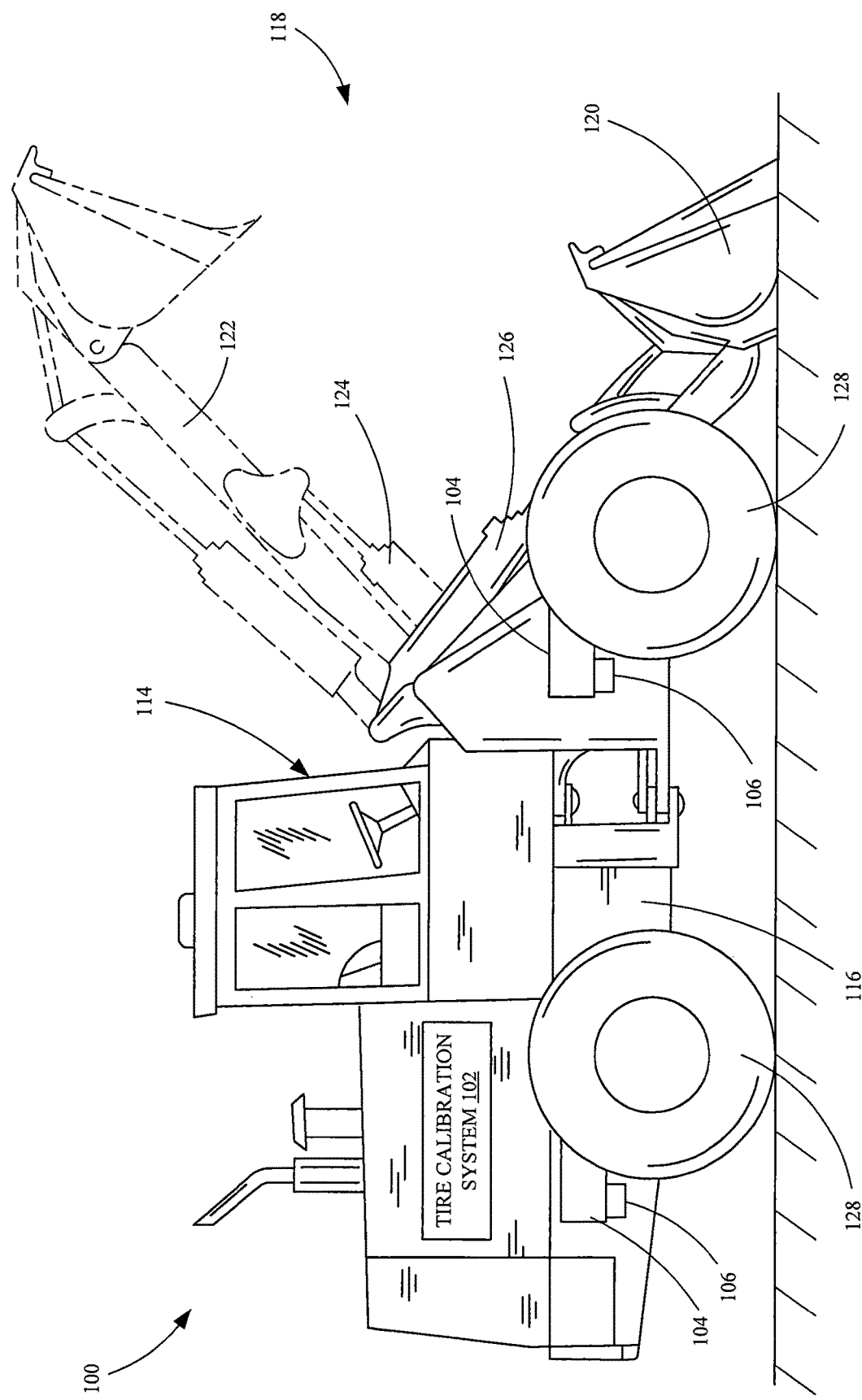
FIG. 1 is a pictorial illustration showing one example of a mobile machine with a tire calibration system.

FIG. 1 is a pictorial illustration showing one example of a mobile machine 100 with a tire calibration system 102. While mobile machine 100 illustratively includes a wheel loader, a wide variety of other mobile machines may be used as well. This can include construction machines, agricultural machines, etc. Additionally, while the present description will proceed with respect to wheel loader 100 having four motors each respectively coupled to a ground-engaging element, it is to be understood that mobile machine 100 may have any number of motor(s) and/or ground-engaging elements.

Mobile machine 100 illustratively includes a cab 114, ground-engaging element(s) 128 (e.g., wheels), motor(s) 104, sensor(s) 106, a frame 116, a boom assembly 118 and a tire calibration system 102. Boom assembly 118 includes a boom 122, a boom cylinder 124, a bucket 120 and a bucket cylinder 126. Boom 122 is pivotally coupled to frame 116 and may be raised and lowered by extending or retracting boom cylinder 124. Bucket 120 is pivotally coupled to boom 122 and may be moved through an extension or retraction of bucket cylinder 126. During operation, mobile machine 100 can be controlled by an operator within cab 114 in which mobile machine 100 can traverse a worksite. In one example, each one of motor(s) 104 are illustratively coupled to, and configured to drive, wheel(s) 128 of mobile machine 100.

Sensor(s) 106 are illustratively speed sensors coupled to each one of motor(s) 104 to detect a motor operating speed. In operation, tire calibration system 102 can receive any or all sensor signals from sensor(s) 106, determine a tire size differential and, based on the determined differential, generate control signals for any or all motor(s) 104 as will be discussed further with respect to FIG. 2.

Figure 2:
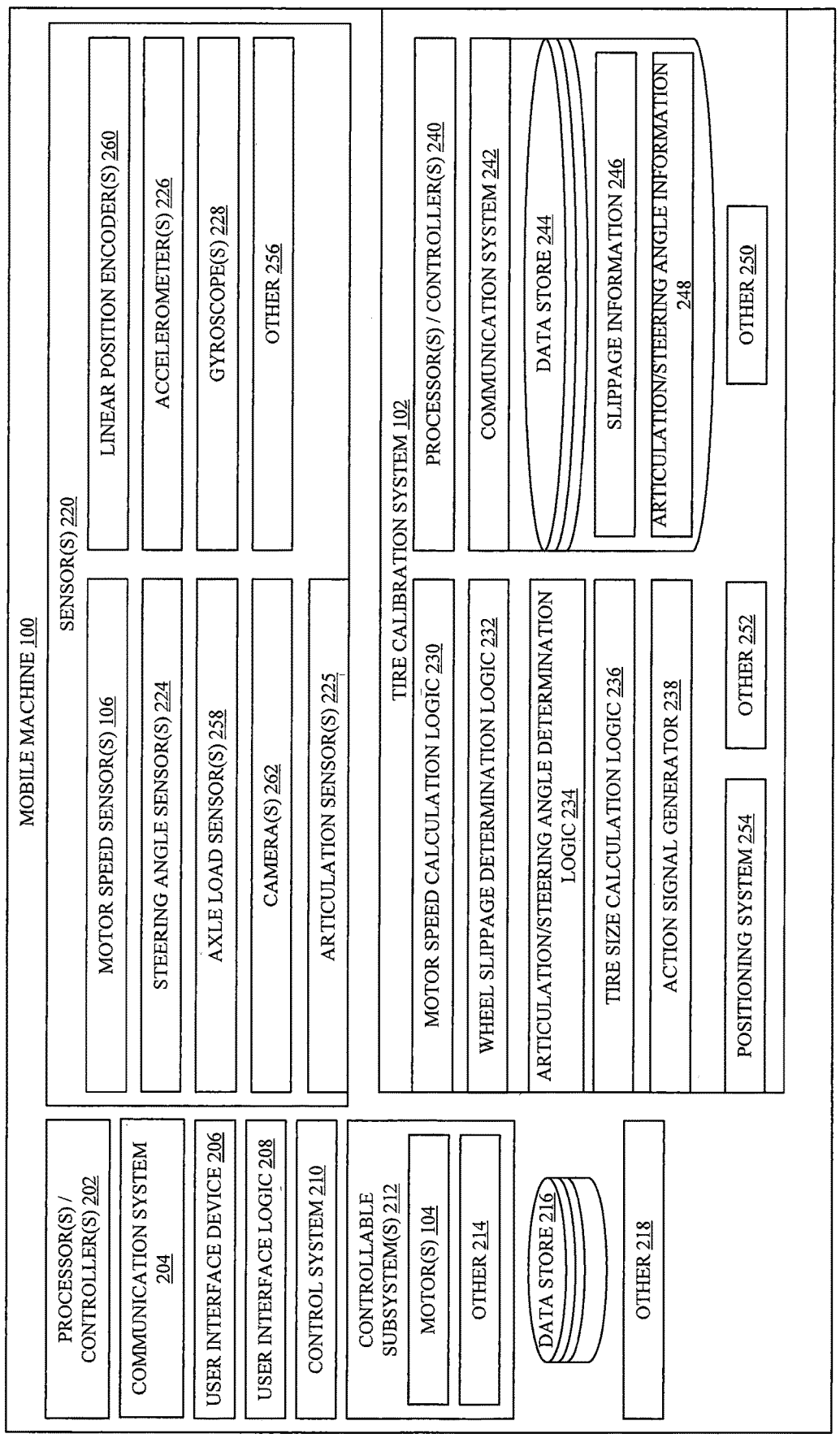
FIG. 2 is a block diagram of a mobile machine with a tire calibration system.

FIG. 2 is a block diagram of mobile machine 100 with tire calibration system 102. Mobile machine 100 illustratively includes processor(s)/controller(s) 202, a communication system 204, a user interface device 206, user interface logic 208, a control system 210, controllable subsystem(s) 212, a data store 216, sensor(s) 220, tire calibration system 102, among other components 218. Before discussing the operation of tire calibration system 102 in more detail, a brief description of some of the items in mobile machine 100, and their operation, will first be provided.

Control system 210 can generate control signals for controlling a variety of different controllable subsystem(s) 212, which may include motor(s) 104, based on sensor signals generated by sensor(s) 220, based on feedback received from tire calibration system 102, based on operator inputs received through user interface device 206, or it can generate control signals in a wide variety of other ways as well. Controllable subsystems 212 can also include other subsystems 214 which may include a wide variety of mechanical, electrical, hydraulic, pneumatic, computer implemented and other systems that relate to the movement of mobile machine 100, the operation that is performed, and other controllable features.

Communication system 204 can include one or more communication systems that allow components of mobile machine 100 to communicate with each other (such as over a controller-area-network (CAN) bus or otherwise). In other examples, communication system 204 can also allow mobile machine 100 to communicate with remote system(s) over a network as well.

User interface device 206 can include display devices, mechanical or electrical devices (e.g., a steering wheel, joysticks, pedals, levers, buttons, etc.), audio devices, haptic devices, and a variety of other devices. In one example, user interface logic 208 generates an operator display on user interface device 206 which can include a display device that is integrated into cab 114 of mobile machine 100, or it can be a separate display on a separate device that can be carried by an operator (such as a laptop computer, a mobile device, etc.).

Data store 216 can store any or all data pertaining to operation of mobile machine 100. In one example, data store 216 can include tire calibration data, tire slippage data and/or articulation/steering angle information as will be discussed later with respect to tire calibration system 102.

Sensor(s) 220 can generate sensor signals which can be used by tire calibration system 102 to accurately determine a tire size differential across mobile machine 100. Based on the tire size differential, tire calibration system 102 can generate one or more action signal(s) for control system 210 to operate motor(s) 104 based on a respective tire size. Sensor(s) 220 can illustratively include motor speed sensor(s) 106, steering angle sensor(s) 224, articulation angle sensors 225, camera(s) 262, linear position encoder(s) 260, accelerometer(s) 226, gyroscope(s) 228, axle load sensor(s) 258, among a variety of other sensor(s) 256.

In operation, briefly, to identify a tire size differential, tire calibration system 102 initially determines a wheel slippage for any or all wheel(s) 128 and an articulation/steering angle for mobile machine 100. If it is determined that a wheel slippage and articulation/steering angle are below respective threshold values, this means that machine 100 is traveling in a relatively straight line and the wheels 128 are not slipping. Tire calibration system 102 receives sensor signal(s) from speed sensor(s) 106 indicative of an operating speed of one or more motor(s) 104 as mobile machine 100 moves. Based on received sensor signal(s) from sensor(s) 106, tire calibration system 102 calculates a speed of each motor and compares each speed value to other speed values obtained for other motor(s) 104 on mobile machine 100. Additionally, in some examples, calculating a speed also includes tire calibration system 102 receiving positional information from a positioning system of mobile machine 100 as will be discussed later.

However, upon calculating a speed for one motor 104 over a predetermined distance/duration and comparing it to other calculated speeds for motor(s) 104, tire calibration system 102 can determine a tire rolling radius size difference among wheel(s) 128. For example, when there is no wheel slippage across wheel(s) 128 and an articulation angle (or steering angle) of mobile machine 100 is zero degrees (or small), a speed difference among motor(s) 104 corresponds to a tire rolling radius size difference among wheel(s) 128. This indicates a tire size differential for the tires on mobile machine 100. Based on the difference in tire sizes, tire calibration system 102 can determine how to generate control signals for motor(s) 104. Action signal(s) may then be generated for control system 210 to operate one or more motor(s) 104 in accordance with the tire sizes (rolling radius size differences) identified by tire calibration system 102. Additionally, it is to be understood that the predetermined distance/duration over which the calibration is performed can include any distance or duration that allows tire calibration system 102 to calculate a speed (such as a moving average speed) and, subsequently, a tire rolling radius size difference for wheel(s) 128.

Furthermore, while the present description describes determining both a wheel slippage for any or all wheel(s) 128 and an articulation/steering angle for mobile machine 100, it is to be understood that the wheel slippage and articulation/steering angle may be determined in any order. Both may be determined simultaneously as well. Additionally, while the present description proceeds with respect to determining a wheel slippage, in other examples, depending on a time frame in which a moving average speed for one or more motor(s) 104 is determined, a wheel slippage may be able to be ignored. This may be based on mobile machine 100 being unable to maintain a constant state of slipping.

Now turning to tire calibration system 102, tire calibration system 102 illustratively includes motor speed calculation logic 230, wheel slippage determination logic 232, articulation/steering angle determination logic 234, tire size calculation logic 236, an action signal generator 238, a positioning system 254, processor(s)/controller(s) 240, a communication system 242, a data store 244, among other components 252. Additionally, it is to be understood that any or all logic of tire calibration system 102 can be implemented on or by processor(s)/controller(s) 240.

Positioning system 254 can include one or more of a global positioning system (GPS) receiver, a LORAN system, a dead reckoning system, a cellular triangulation system, or other positioning system that enables tire calibration system 102 to determine positional information for mobile machine 100 and/or wheel(s) 128. This may include x-axis, y-axis and z-axis coordinate information in one example. Additionally, in one example, tire calibration system 102 can use information from positioning system 254 to more accurately calculate a true rolling radius of wheel(s) 128. In this example, tire calibration system 102 can receive positional information from positioning system 254 indicative of a position of mobile machine 100 and/or wheel(s) 128 as mobile machine 100 moves. In one example, this allows tire calibration system 102 to more accurately determine the ground speed of machine 100 and use that to determine a tire size differential as will be discussed later.

Communication system 242 can include one or more communication systems that allow for the respective components and/or logic of tire calibration system 102 to communicate with each other, as well as other components of mobile machine 100. Additionally, in other examples, communication system 242 also allows for tire calibration system 102 to communicate with remote system(s) over a network as well.

Data store 244 can store any or all data pertaining to an operation of mobile machine 100. In one example, this includes wheel slippage information 246, articulation/steering angle information 248, and other information 250 pertaining to mobile machine 100. Wheel slippage information 246 can include wheel slippage threshold value(s) that are used by wheel slippage determination logic 232 as will be discussed later. Similarly, articulation/steering angle information 248 can include articulation/steering angle threshold value(s) that are used by articulation/steering angle determination logic 234 as will be discussed in detail later. Data store 244 can store a variety of other information as well.

Now turning to the logic of tire calibration system 102, motor speed calculation logic 230 receives sensor signal(s) from motor speed sensor(s) 106, determines a current operating speed for any or all motor(s) 104, and generates a motor speed output for tire size calculation logic 236 and/or wheel slippage determination logic 232 indicative of the determined operating speed(s). In one example, motor speed calculation logic 230 may also calculate an average speed of each motor 104 over a predetermined distance/duration as mobile machine 100 traverses a worksite or other ground. In this example, an average speed for each motor may be output to tire size calculation logic 236 to determine a tire size differential.

Wheel slippage determination logic 232 detects a presence of wheel slippage for wheel(s) 128 and generates a wheel slippage output for tire size calculation logic 236. For example, in order to accurately determine a tire size differential across wheel(s) 128 based on comparing a moving average speed for each motor 104 to other respective motors 104, a wheel slippage should be below a threshold value. A wheel slippage threshold value can be a variety of values depending on a tire calibration operation. However, in one example, a wheel slippage threshold value can correspond to a value indicative of no wheel slippage across wheel(s) 128. In this example, a wheel slippage output can be provided to tire size calculation logic 236 indicating that a wheel slippage for any or all wheel(s) 128 is either below or above the wheel slippage threshold value. In one example, if there is no wheel slippage across wheel(s) 128 (or if it is below the threshold value), tire size calculation logic 236 can determine a tire size differential for wheel(s) 128. However, if a presence of wheel slippage exceeds the wheel slippage threshold value, tire size calculation logic 236 can delay determining a tire size differential until a wheel slippage is below the threshold value.

While one example of detecting wheel slippage will now be discussed, it is contemplated that wheel slippage determination logic 232 can determine wheel slippage in a variety of ways. However, in one example, to detect wheel slippage for wheel(s) 128, wheel slippage determination logic 232 can calculate or sense an operating torque for any or all motor(s) 104 indicating whether wheel slippage is likely.

In this example, wheel slippage determination logic 232 can receive the output from motor speed calculation logic 230 indicative of an operating speed for motor(s) 104. Based on the operating speed of motor(s) 104, and a known horsepower of motor(s) 104, wheel slippage determination logic 232 can calculate an operating torque for any or all motor(s) 104. Based on the calculated torque(s), wheel slippage determination logic 232 can then determine wheel slippage for wheel(s) 128. For example, during a low torque operation, wheel slippage is unlikely. Therefore, based on the calculated torque(s), an output may then be provided to tire size calculation logic 236 indicating wheel slippage for any or all wheel(s) 128.

In other examples, wheel slippage determination logic 232 can receive a variety of other inputs to detect a presence of wheel slippage which may include receiving outputs from other subsystems (such as a traction control subsystem) on mobile machine 100, sensor(s) 220, user inputs, etc.

Articulation/steering angle determination logic 234 receives sensor signal(s) from any or all sensor(s) 220 and/or positioning system 254 to determine an articulation angle (or steering angle) for mobile machine 100. Based on the articulation/steering angle, articulation/steering angle determination logic 234 generates an articulation/steering output for tire size calculation logic 236 indicative of the determined angle.

To accurately determine a tire size differential for wheel(s) 128 based on comparing a moving average speed of each motor 104 over a predetermined distance/duration to other respective motors 104, an articulation/steering angle, in one example, is initially determined. For example, if an articulation/steering angle is greater than zero (or a relatively small threshold value) this means machine 100 is turning. Wheel(s) 128 will have different angular positions relative to each other as mobile machine 100 traverses a worksite. As a result, each wheel 128 may travel different distances (the tires on the inside of the turn traveling a shorter distance than those on the outside of the turn) leading to an added consideration for tire calibration system 102 to accurately determine a tire size differential across wheel(s) 128. Therefore, in one example, articulation/steering angle determination logic 234 can determine an articulation/steering angle for mobile machine 100 based on received positional information and/or sensor signal(s) from sensor(s) 220, compare the determined angle to an articulation/steering angle threshold value, and generate an articulation/steering output for tire size calculation logic 236 indicative of whether the articulation/steering angle is above or below the articulation/steering angle threshold value.

In one example, if the articulation/steering angle is above the threshold value, tire size calculation logic 236 can delay determining a tire size differential for mobile machine 100 until the articulation/steering angle is at or below the articulation/steering angle threshold value. Alternatively, in other examples, tire size calculation logic 236 can utilize the determined articulation/steering angle, and known or sensed machine geometry, in calculating a tire size differential. By knowing machine geometry, the difference in travel distance around a turn (of the inside and outside wheels) can be determined. Additionally, in some examples, upon receiving an articulation/steering output indicating the articulation/steering angle is above the articulation/steering angle threshold value, tire size calculation logic 236 can also utilize moving average speeds of motor(s) 104 to offset actual measured speeds of motor(s) 104 during periods in which the articulation/steering output is greater than the articulation/steering angle threshold value. However, this is but one example.

In order to determine an articulation/steering angle for mobile machine 100, articulation/steering angle determination logic 234 can receive positional information from positioning system 254 and/or sensor signal(s) from steering wheel angle sensor(s) 224, camera(s) 262, linear position encoder(s) 260, accelerometer(s) 226, gyroscope(s) 228, axle load sensor(s) 258, and other sensor(s) 256. For example, steering angle sensor(s) can indicate a current angular position for a wheel on mobile machine 100 relative to the frame or relative to another reference. Based on the determined angular position, articulation/steering angle determination logic 234 can determine whether the articulation/steering angle of mobile machine 100 is above or below the articulation/steering angle threshold value.

In other examples, accelerometer(s) 226, gyroscope(s) 228, camera(s) 262, linear position encoder(s) 260, angle encoders, rotary potentiometers, and/or axle load sensor(s) 258 may be positioned at various joints along frame 116 of mobile machine 100 and generate sensor signal(s) indicative of an articulation/steering angle of mobile machine 100 (e.g., indicative of an extent to which machine 100 is turning). Once an articulation/steering angle is obtained and subsequently compared to an articulation/steering angle threshold value, articulation/steering angle determination logic 234 can generate an articulation/steering output for tire size calculation logic 236 indicative of the articulation/steering angle and/or an output indicative of the comparison of the articulation/steering angle to the articulation/steering angle threshold value.

Tire size calculation logic 236 receives the motor speed output, wheel slippage output and the articulation/steering angle output and determines a tire size differential across mobile machine 100. In one example, upon receiving the wheel slippage output, indicating a detected presence of wheel slippage is below the wheel slippage threshold value, and the articulation/steering angle output, indicating a detected articulation/steering angle is below the articulation/steering angle threshold value, tire size calculation logic 236 can use the motor speed output from motor speed calculation logic 230 to determine a tire size differential across wheel(s) 128 of mobile machine 100. This can include identifying the rolling radius (or other size) of each tire and comparing them, or identifying the differential directly from the speed or in other ways.

In one example, this includes tire size calculation logic 236 determining a moving average speed for each motor 104 over a predetermined distance/duration based on received motor speed output(s) from motor speed calculation logic 230. Once a moving average speed is calculated for each motor 104, tire size calculation logic 236 can compare the moving average speed of each motor 104 to the other motor(s) 104 to identify a tire rolling radius size difference among wheel(s) 128. For example, in an absence of wheel slippage and an articulation/steering angle near zero for mobile machine 100, a difference among the moving average motor speed(s) for motor(s) 104 corresponds to a tire rolling radius size difference. Additionally, in some examples, tire size calculation logic 236 can compare the moving average speed of each motor 104 to a theoretical motor operating speed. In this example, based on the comparison of the moving average speed of each motor 104, or instantaneous speed of each motor 104, to the theoretical motor operating speed, tire size calculation logic 236 can identify a tire rolling radius size difference. However, the moving average speed of each motor 104, in other examples, can also be calculated and compared to a measured ground speed with GPS, radar, or any other method.

Based on the tire rolling radius size difference among wheel(s) 128, tire size calculation logic 236 can determine a tire size differential across wheel(s) 128. Furthermore, tire size calculation logic 236 can receive positional information from positioning system 254, in some examples, to allow tire size calculation logic 236 to more accurately determine a moving average speed as mobile machine 100 moves.

However, once the tire rolling radius differences are calculated for wheel(s) 128, tire size calculation logic 236 can determine whether any or all wheel(s) 128 include a tire having a different size relative to the other tires on wheel(s) 128 of mobile machine 100. If tire size calculation logic 236 determines a wheel 128 includes a different sized tire, tire size calculation logic 236 generates a tire size output for action signal generator 238. In one example, the tire size output can indicate a relative tire size differential among wheel(s) 128 or a particular tire size for any or all wheel(s) 128.

Action signal generator 238, upon receiving the tire size output from tire size calculation logic 236, determines what control signal(s) should be provided to motor(s) 104 to accommodate for a tire size differential. For example, based on a relative tire size of one wheel 128 being either smaller or larger relative to other wheel(s) 128 on mobile machine 100, action signal generator 238 determines what relative speed and/or torque the motor(s) 104 should be operated at to accommodate for the smaller or larger tire on wheel 128. This can include a particular operating speed, torque, or other operating parameters. For instance, if machine is being commanded to move at a particular speed (such as by an operator), then action signal generator 238 can generate a control parameter for each of motors 104 indicative of how they should be controlled relative to one another so machine 100 travels at the commanded speed. The control parameters may, for example, indicate that the motors 104 corresponding to the larger wheels should drive them at a particular fraction of the speed relative to the motors corresponding to the smaller wheels. This is just one example.

Once action signal generator 238 determines what control signals should be provided, action signal generator 238 generates an action signal (indicative of control parameters) for control system 210 to operate the motor(s) 104 according to the determined control parameters. Control system 210, upon receiving the action signal, generates control signal(s) for any or all motor(s) 104 in accordance with the control parameters as determined by action signal generator 238. In this manner, each motor 104 coupled to wheel(s) 128 can be operated in accordance with a tire size differential across wheel(s) 128.

Figure 3A:
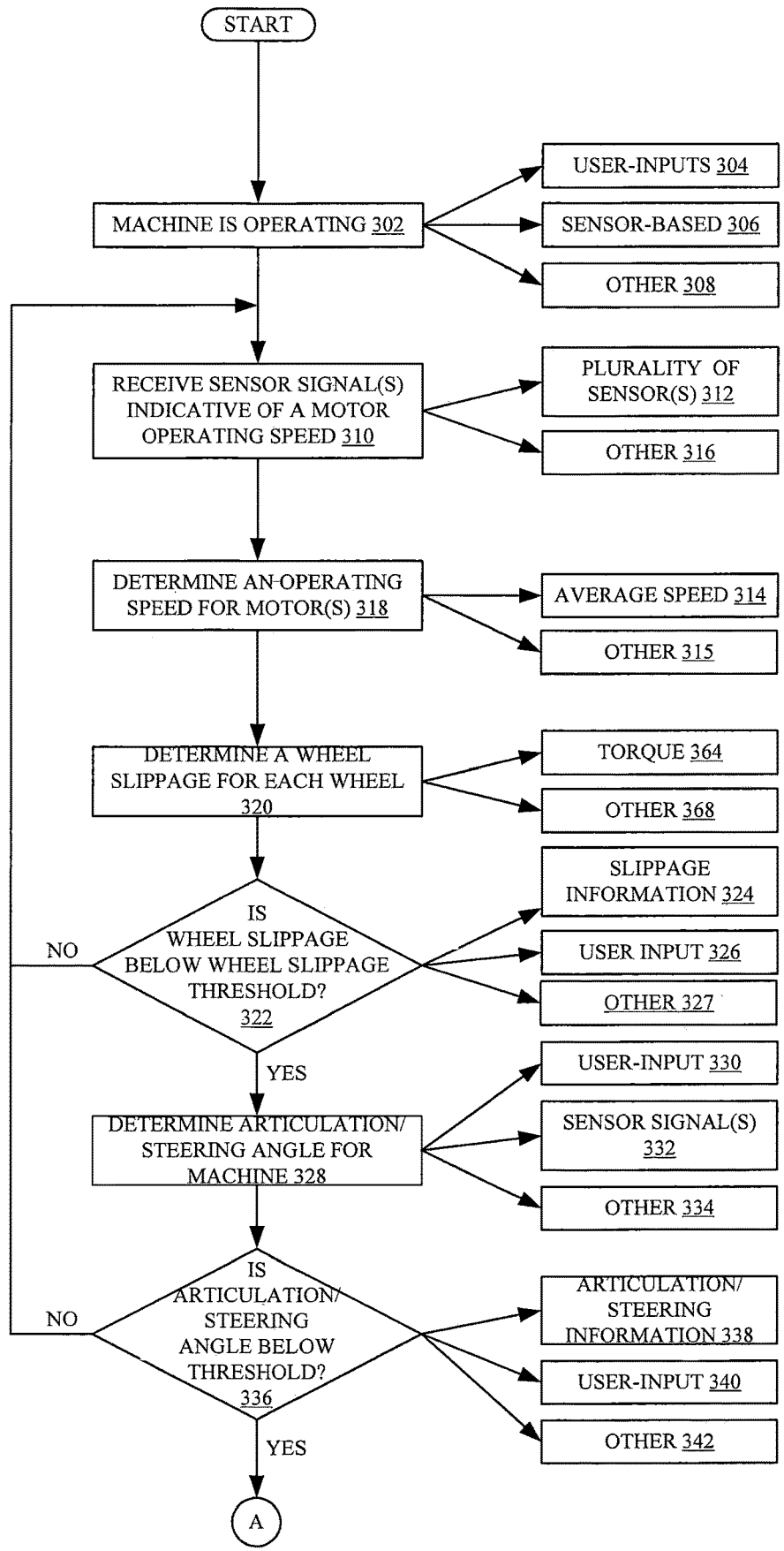
FIGS. 3A-3B are flow diagrams showing one example of controlling one or more motors based on a tire size differential using a tire calibration system illustrated in FIG. 2.
Figure 3B:
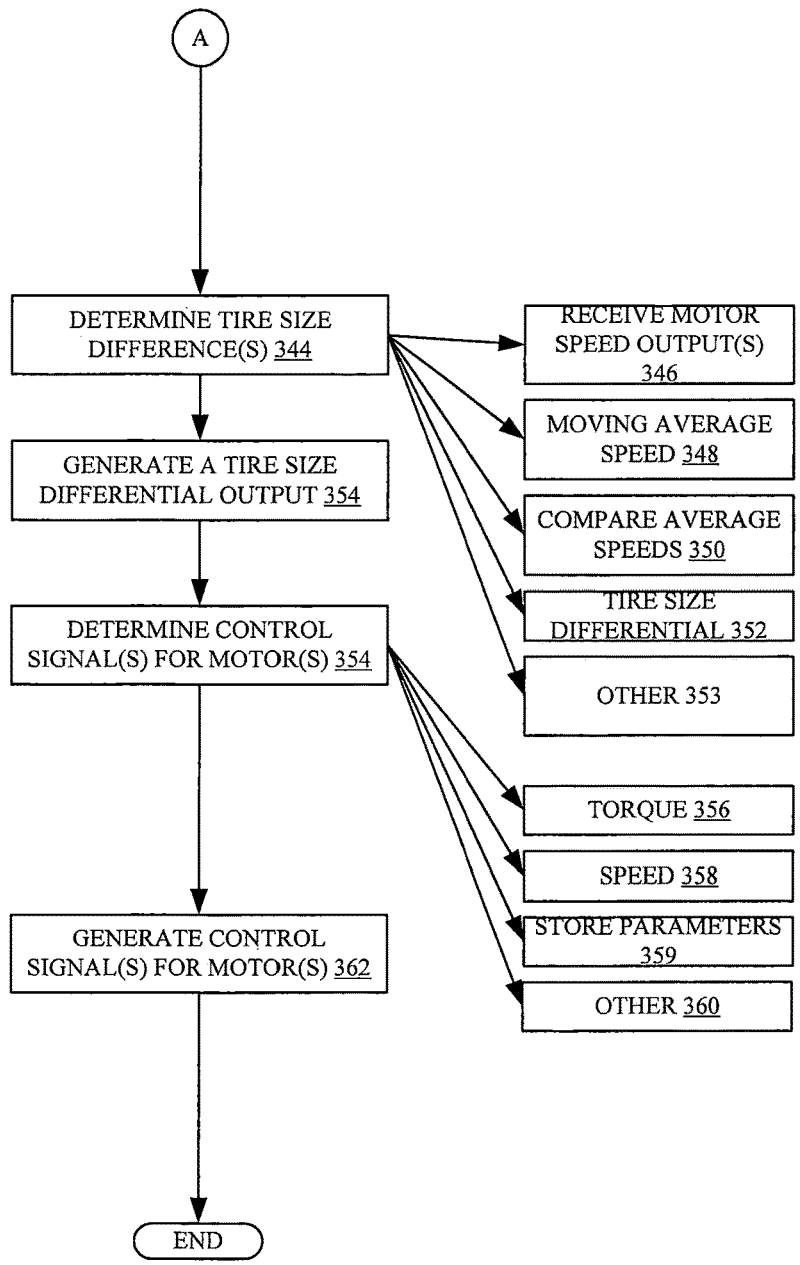

FIGS. 3A-3B are flow diagrams showing one example of controlling one or more motor(s) 104 based on a tire size differential using tire calibration system 102 illustrated in FIG. 2. While it is discussed in the context of determining a wheel slippage, articulation/steering angle and tire size differential for mobile machine 100, additional or different data can also be gathered as well. Additionally, it is to be understood that the operation performed by tire calibration system 102 can be carried out at any time or at any point or intermittently throughout a worksite operation or at other times. Further, while the operation will be described in accordance with mobile machine 100 being in the form of a wheel loader, it is to be understood that the operation may be utilized in other mobile machines as well.

Processing begins at block 302 where it is initially assumed that mobile machine 100 is operating. This can be based on a variety of inputs. For instance, an operator can provide initial machine settings and control inputs based on a worksite operation as indicated by block 304. This can be based on the operators own knowledge and prior experience. The settings (such as machine speed, etc.) can be made manually, such as through mechanical or other user input mechanisms, or they can be made automatically by the machine itself, as indicated by block 306, or they can be input in a different way, such as through a touch screen or other user input mechanisms as indicated by block 308.

During operation of mobile machine 100, sensor signal(s) are generated by motor speed sensor(s) 106, coupled to motor(s) 104, and received by motor speed calculation logic 230 as indicated by block 310. In one example, this includes receiving sensor signal(s) from a plurality of speed sensor(s) 106 coupled to motor(s) 104 of mobile machine 100 as indicated by block 312. However, motor speed calculation logic 230 can receive a variety of other information as well as indicated by block 316.

Upon receiving sensor signal(s) from motor speed sensor(s) 106, processing continues to block 318 where motor speed calculation logic 230 determines an operating speed for motor(s) 104 of mobile machine 100. In one example, motor speed calculation logic 230 can determine an average speed of motor(s) 104 over a predetermined distance and/or time as indicated by block 314. For example, as mobile machine 100 traverses a worksite, speed sensor(s) 106 can generate signal(s) indicative of operating speeds of motor(s) 104 at various distances and/or times as mobile machine 100 moves. Based on the received sensor signal(s) at various distances and/or times, motor speed calculation logic 230 can determine an average speed of motor(s) 104 over a defined distance/duration. The speed can be determined in other ways as well. This is indicated by block 315.

Once motor speed calculation logic 230 determines an operating speed for motor(s) 104, a motor speed output is generated by motor speed calculation logic 230 for tire size calculation logic 236 and wheel slippage determination logic 232. Processing then continues at block 320 where wheel slippage determination logic 232 determines wheel slippage (if any) for any or all wheel(s) 128 of mobile machine 100. It will be noted that wheel slippage can be determined at any time. In one example, this includes initially calculating an operating torque for motor(s) 104 based on the received motor speed output(s) and a known horsepower for motor(s) 104 as indicated by block 364. Based on the calculated torques for motor(s) 104, wheel slippage determination logic 232 can determine a wheel slippage for wheel(s) 128. However, it is contemplated that wheel slippage determination logic 232 can determine wheel slippage in a variety of other ways as well, such as using a traction control system or other systems, as indicated by block 368.

Upon determining wheel slippage for wheel(s) 128, wheel slippage determination logic 232 compares the wheel slippage to a wheel slippage threshold value as indicated by block 322. In one example, wheel slippage threshold value(s) can be stored within wheel slippage information 246, as indicated by block 324, or provided through a user input as indicated by block 326, or in other ways, as indicated by block 327. Wheel slippage threshold value(s) can include a variety of values, but, in one example, may correspond to a value indicative of zero-wheel slippage across wheel(s) 128.

Based on the comparison of the wheel slippage to the wheel slippage threshold value, wheel slippage determination logic 232 generates a wheel slippage output for tire size calculation logic 236 indicative of the comparison. In one example, if the wheel slippage output indicates the determined wheel slippage is above the wheel slippage threshold value, then system 102 waits to identify a tire size differential at a time when less wheel slippage is present, and processing reverts back to block 310 where motor speed calculation logic 230 receives sensor signal(s) from speed sensor(s) 106. However, if the wheel slippage output indicates the determined wheel slippage is below the wheel slippage threshold, processing continues at block 328 where articulation/steering angle determination logic 234 determines an articulation/steering angle for mobile machine 100.

In one example, articulation/steering angle determination logic 234 can determine an articulation/steering angle of mobile machine 100 based on a user-input, as indicated by block 330, received sensor signal(s) from sensor(s) 220, as indicated by block 332, or in a variety of other ways as indicated by block 334. For example, articulation/steering angle determination logic 234 can receive sensor signal(s) from steering angle sensor(s) 224, camera(s) 262, linear position encoder(s) 260, accelerometer(s) 226, gyroscope(s) 228, axle load sensor(s) 258, rotary potentiometers, or a variety of other sensor(s) 256. In one example, articulation/steering determination logic 234 can receive sensor signal(s) from steering angle sensor(s) 224 indicating an angular position (or steering angle) of wheels 128 on mobile machine 100. Based on the received steering angle signal(s), articulation/steering angle determination logic 234 can determine a relative articulation/steering angle for mobile machine 100.

However, articulation/steering angle determination logic 234 can determine an articulation/steering angle in a number of other ways as well. For example, camera(s) 262 can be positioned along various points along frame 116 and generate images indicative of an angular position of frame 116 or components coupled to mobile machine 100 (such as an angle of the different articulated portions of the frame or wheels 128 relative to the frame 116). Based on the received images, articulation/steering angle determination logic 234 can perform image processing to identify an articulation/steering angle. This is but one example.

Once an articulation/steering angle is determined for mobile machine 100, articulation/steering angle determination logic 234 compares the determined angle to a threshold value as indicated by block 336. The threshold value can include a variety of values depending on a tire calibration operation. However, in one example, the articulation/steering angle threshold value can correspond to an articulation/steering angle of zero degrees. Additionally, it is to be understood that articulation/steering angle threshold values may be stored within articulation/steering angle information 248, as indicated by block 338, or provided from a user input, as indicated by block 340, or other sources as indicated by block 342.

Based on the comparison, articulation/steering angle determination logic 234 generates an articulation/steering output for tire size calculation logic 236 indicative of whether the determined articulation/steering angle is at, above or below the articulation/steering angle threshold value. In one example, if the articulation/steering output indicates the articulation/steering angle is above the articulation/steering angle threshold value, this means that machine 100 is turning too sharply to identify the tire sizes and processing reverts to block 310 where motor speed calculation logic 230 receives sensor signal(s) from speed sensor(s) 220. However, if the articulation/steering output indicates the articulation/steering angle is at or below the articulation/steering angle threshold value, processing continues at block 344 where tire size calculation logic 236 determines a tire size differential for wheel(s) 128 of mobile machine 100.

In another example, even if machine 100 is turning, the tire size differential can be calculated. This can be done by knowing the articulation/steering angle and the machine geometry, as well as the different motor speeds.

In one example, tire size calculation logic 236 may be configured to only determine a tire size differential if the wheel slippage output indicates no wheel slippage and the articulation/steering output indicates an articulation/steering angle of mobile machine 100 is zero degrees. However, this is but an example only. Upon determining a tire size differential is to be calculated, tire size calculation logic 236 uses the motor speed output from motor speed calculation logic 230 to determine a tire size differential across mobile machine 100.

In one example, tire size calculation logic 236 can receive the motor speed output (as indicated by block 346) and determine a moving average speed of each motor 104 (as indicated by block 348) as mobile machine 100 traverses a worksite in which a wheel slippage is at or below the wheel slippage threshold value and an articulation/steering angle is at or below the articulation/steering angle threshold value. Once a moving average speed of each motor 104 of mobile machine 100 is calculated over a predetermined distance/duration, tire size calculation logic 236 compares a moving average speed of one motor 104 to that of the remaining motor(s) 104 on mobile machine 100 (as indicated by block 350) to identify a tire rolling radius size difference among wheel(s) 128, as indicated by block 346. Based on the tire rolling radius size difference among wheel(s) 128, tire size calculation logic 236 can determine a tire size differential across wheel(s) 128, as indicated by block 352. The tire size differential can be done in other ways as well, as indicated by block 353.

Once a tire size differential is determined across wheel(s) 128, tire size calculation logic 236 generates a tire size output for action signal generator 238 indicative of the determined tire size differences. This is indicated by block 354. Processing continues at block 354 where action signal generator 238, upon receiving the tire size output, determines what control signal(s) should be generated for one or more motor(s) 102 to accommodate the tire size differential across wheel(s) 128. This is indicated by block 355. In one example, this includes action signal generator 238 identifying a torque for motor(s) 104, as indicated by block 356. In another example, this includes identifying an operating speed for the different motors 104, as indicated by block 358. The parameters can then be stored for later or control use. This is indicated by block 359. It can include identifying other parameters as indicated by block 360.

Once the operating characteristics or parameters for motor(s) 104 are determined or identified, action signal generator 238 generates action signal(s) for control system 210 indicative of, or based on, the determined operating parameters. Control system 210, upon receiving the action signals, generates control signal(s) for motor(s) 104 based on the operating parameters as indicated by block 362.

By controlling motor(s) 104 based on a tire size differential across mobile machine 100, motor(s) 104 will not act against each other as mobile machine 100 traverses a worksite. For instance, if machine 100 has been commanded to operate at a given ground speed (such as by an operator input), then control system 210 will generate different speed control signals for the different motors 104 to vary the motor speed to accommodate for different tire sizes to achieve the commanded ground speed. Were this not the case, and all motors were controlled to rotate at the same speed, the different tire sizes would lead to inefficiency, less accurate control and more tire wear. This system 102 and operation improves tire wear and enables mobile machine 100 to operate more efficiently and accurately. Once motor(s) 104 are controlled based on the determining operating parameters, processing subsequently ends.

Again, the tire size calculation process can be repeated as desired. It can be repeated after a threshold number of rules or operating hours have been reached. It can be intermittently repeated based on other criteria as well.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 4:
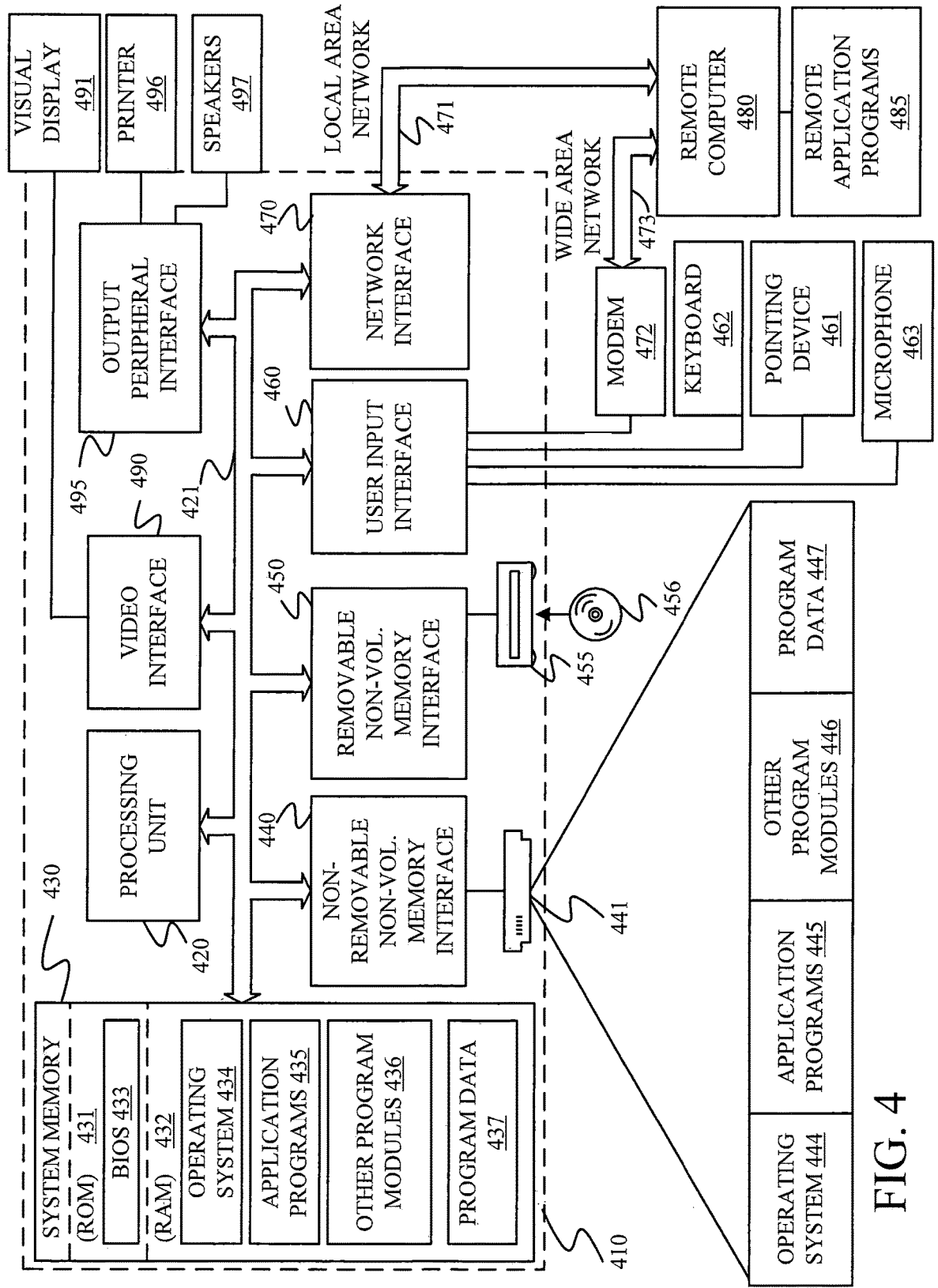
FIG. 4 is a block diagram illustrating one example of a computing environment that can be deployed in any of the machines, systems, and/or architectures shown in previous figures.

FIG. 4 is a block diagram of one example of a computing environment. With reference to FIG. 4, an example system for implementing some embodiments includes a general-purpose computing device in the form of a computer 410. Components of computer 410 may include, but are not limited to, a processing unit 420 (which can comprise processors or servers from other FIGS.), a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. Memory and programs described with respect to FIGS. 1-2 can be deployed in corresponding portions of FIG. 4.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable volatile/nonvolatile computer storage media. By way of example only, FIG. 4 illustrates a hard disk drive 441 that reads from or writes to non-removable, nonvolatile magnetic media, an optical disk drive 455, and nonvolatile optical disk 456. The hard disk drive 441 is typically connected to the system bus 421 through a non-removable memory interface such as interface 440, and optical disk drive 455 are typically connected to the system bus 421 by a removable memory interface, such as interface 450.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 4, provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437.

A user may enter commands and information into the computer 410 through input devices such as a keyboard 462, a microphone 463, and a pointing device 461, such as a mouse, trackball or touch pad. Other input devices (not shown) may include foot pedals, steering wheels, levers, buttons, a joystick, game pad, satellite dish, scanner, or the like. These and other input devices are often connected to the processing unit 420 through a user input interface 460 that is coupled to the system bus, but may be connected by other interface and bus structures. A visual display 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 is operated in a networked environment using logical connections (such as a local area network—LAN, or wide area network WAN) to one or more remote computers, such as a remote computer 480.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. In a networked environment, program modules may be stored in a remote memory storage device. FIG. 4 illustrates, for example, that remote application programs 485 can reside on remote computer 480.

It should also be noted that the different examples described herein can be combined in different ways. That is, parts of one or more examples can be combined with parts of one or more other examples. All of this is contemplated herein.

Example 1 is a mobile machine, comprising:
a plurality of ground-engaging elements that each comprise a tire;
a plurality of motors, one motor coupled to each of the plurality of ground-engaging elements configured to drive movement of the plurality of ground-engaging elements;
a speed sensor coupled to each motor configured to generate speed signals indicative of an operating speed of each motor;
a tire calibration system configured to receive the speed signals from each speed sensor and to identify a tire size differential across the plurality of ground-engaging elements based on the speed signals; and
a control system configured to generate a separate control signal for each of the plurality of motors based on the tire size differential.

Example 2 is the mobile machine of any or all previous examples, wherein the tire calibration system comprises:
wheel slippage determination logic configured to determine a wheel slippage value indicative of wheel slippage for the plurality of ground-engaging elements; and
articulation/wheel angle determination logic configured to identify an articulation/steering angle for the mobile machine.

Example 3 is the mobile machine of any or all previous examples, wherein the tire calibration system determines the tire size differential across the plurality of ground-engaging elements based on the speed signals, the wheel slippage value for the plurality of ground-engaging elements and the articulation/steering angle for the mobile machine.

Example 4 is the mobile machine of any or all previous examples, wherein the tire calibration system comprises:
motor speed calculation logic configured to receive the speed signals from each speed sensor, determine the operating speed of each motor based on the received speed signals and generate a motor speed output indicative of the operating speed of each motor.

Example 5 is the mobile machine of any or all previous examples, further comprising:
an angle sensor configured to generate an angle signal indicative of the articulation/steering angle of the mobile machine.

Example 6 is the mobile machine of any or all previous examples, wherein the angle sensor comprises at least one of a steering angle sensor configured to detect a steering angle of the mobile machine, and an articulation angle sensor configured to detect an articulation angle of the mobile machine.

Example 7 is the mobile machine of any or all previous examples, wherein the articulation/steering angle determination logic is configured to receive the signal from the angle sensor, identify the articulation/steering angle based on the sensor signal and generate an articulation/steering angle output indicative of a comparison of the articulation/steering angle to an angle threshold value.

Example 8 is the mobile machine of any or all previous examples, wherein the wheel slippage determination logic is configured to receive the speed signals, determine the wheel slippage value for the plurality of ground-engaging elements based on the speed signals, and generate a wheel slippage output indicative of a comparison of the wheel slippage to a wheel slippage threshold value.

Example 9 is the mobile machine of any or all previous examples, wherein the tire calibration system comprises:
  tire size calculation logic configured to receive the motor speed output, the articulation/steering angle output and the wheel slippage output, and determine the tire size differential across the plurality of ground-engaging elements and generate a tire size output indicative of the tire size differential.

Example 10 is the mobile machine of any or all previous examples, wherein the motor speed calculation logic is configured to determine a moving average speed of each motor, using the received motor speed outputs, and wherein the tire size calculation logic determines the tire size differential across the plurality of ground-engaging elements by comparing the moving average speed of each motor to the moving average speed of the other motors coupled to the ground-engaging elements.

Example 11 is the mobile machine of any or all previous examples, wherein the tire calibration system further comprises:
  an action signal generator configured to receive the tire size output indicative of the tire size differential across the ground-engaging elements, determine motor operating parameters based on the tire size differential and generate action signals indicative of the determined motor operating parameters.

Example 12 is the mobile machine of any or all previous examples, wherein the control system, upon receiving the action signals, generates the control signals to operate the motors based on the determined motor operating parameters.

Example 13 is a method of controlling a mobile machine, comprising:
  detecting an operating speed for each of a plurality of motors coupled to a ground-engaging element, having a tire, of the mobile machine based on speed signals received from a plurality of speed sensors, one speed sensor coupled to a corresponding motor;
  based on the operating speeds for each motor, generating a motor speed output indicative of the operating speed of each motor;
  detecting a wheel slippage for each of the ground-engaging elements of the mobile machine based on the speed signals received from the speed sensors;
  generating a wheel slippage output indicative of a comparison of the wheel slippage to a wheel slippage threshold value;
  detecting an articulation/steering angle of the mobile machine based on a sensor signal received from an angle sensor coupled to the mobile machine;
  generating an articulation/steering angle output indicative of a comparison of the articulation angle to an angle threshold value;
  determining a tire size differential indicative of differences in tire size for each tire of the ground-engaging elements based on the motor speed output, wheel slippage output and articulation/steering angle output; and
  generating separate motor control signals to control each of the plurality of motors based on the tire size differential.

Example 14 is the method of any or all previous examples, further comprising:
  determining control parameters for each of the plurality of motors coupled to the ground-engaging elements based on the tire size for each of the ground-engaging elements; and
  generating the separate motor control signals for each motor to operate the motor in accordance with the control parameters.

Example 15 is the method of any or all previous examples, wherein determining the tire size for each tire comprises:
  detecting that the wheel slippage and the articulation/steering angle are below the wheel slippage threshold value and the angle threshold value, respectively;
  identifying a moving average speed of each motor based on the motor speed outputs;
  comparing the moving average speed of one of the plurality of motors to the moving average speeds of the other of the plurality of motors on the mobile machine; and
  determining a tire size difference for each tire based on the comparison of the moving average speed of one of the plurality of motors to the moving average speeds of the other of the plurality of motors on the mobile machine.

Example 16 is the method of any or all previous examples, wherein detecting the wheel slippage for each of the ground-engaging elements comprises:
  receiving the speed signals from the speed sensors;
  determining a motor torque for each of the motors based on the operating speeds and horsepower of each of the motors; and
  determining the wheel slippage for each ground-engaging element based on the torque and operating speed for each of the motors.

Example 17 is a mobile machine, comprising:
  a plurality of ground-engaging elements that each comprise a tire;
  a plurality of motors coupled to the plurality of ground-engaging elements, each one of the plurality of motors being configured to drive one of the plurality of ground-engaging elements;
  a plurality of speed sensors, each configured to generate a speed signal indicative of a motor operating speed of one of the plurality of motors;
  a tire calibration system configured to receive the speed signals, determine a moving average speed of each motor based on the speed signals, and determine a relative tire size of each of the tires relative to the other tires based on a comparison of the moving average speed of each of the plurality of motors to the other motors of the plurality of motors; and
  a control system configured to generate motor control signals for the plurality of motors based on the relative tire sizes.

Example 18 is the mobile machine of any or all previous examples, wherein the tire calibration system further comprises:

wheel slippage determination logic configured to detect a wheel slippage for the plurality of ground-engaging elements; and articulation/steering angle determination logic configured to detect an articulation/steering angle for the mobile machine.

Example 19 is the mobile machine of any or all previous examples, wherein the tire calibration system comprises:

tire size calculation logic configured to determine the relative tire size of the tires based on the wheel slippage, the articulation/steering angle and the comparison of the moving average speed of each of the plurality of motors to the other of the plurality of motors.

Example 20 is the mobile machine of any or all previous examples, wherein the mobile machine comprises a wheel loader.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile machine, comprising:
   a plurality of ground-engaging elements that each comprises a tire;
   a plurality of motors, one motor coupled to each of the plurality of ground-engaging elements configured to drive movement of the plurality of ground-engaging elements;
   a speed sensor coupled to each motor configured to generate speed signals indicative of an operating speed of each motor;
   a tire calibration system, comprising one or more processors, configured to receive the speed signals from each speed sensor and to identify a tire size differential across the plurality of ground-engaging elements based on the speed signals,
   wherein each of the plurality of motors is controlled based on the tire size differential.

2. The mobile machine of claim 1, wherein the tire calibration system is configured to:
   determine a wheel slippage value indicative of wheel slippage for the plurality of ground-engaging elements, and
   identify an articulation/steering angle for the mobile machine.

3. The mobile machine of claim 2, wherein the tire calibration system determines the tire size differential across the plurality of ground-engaging elements based on the speed signals, the wheel slippage value for the plurality of ground-engaging elements and the articulation/steering angle for the mobile machine.

4. The mobile machine of claim 3, wherein the tire calibration system is configured to:
   receive the speed signals from each speed sensor, determine the operating speed of each motor based on the received speed signals and generate a motor speed output indicative of the operating speed of each motor.

5. The mobile machine of claim 4, further comprising:
   an angle sensor configured to generate an angle signal indicative of the articulation/steering angle of the mobile machine.

6. The mobile machine of claim 5, wherein the angle sensor comprises at least one of a steering angle sensor configured to detect a steering angle of the mobile machine, and an articulation angle sensor configured to detect an articulation angle of the mobile machine.

7. The mobile machine of claim 6, wherein the tire calibration system is configured to receive the signal from the angle sensor, identify the articulation/steering angle based on the sensor signal and generate an articulation/steering angle output indicative of a comparison of the articulation/steering angle to an angle threshold value.

8. The mobile machine of claim 7, wherein the tire calibration system is configured to receive the speed signals, determine the wheel slippage value for the plurality of ground-engaging elements based on the speed signals, and generate a wheel slippage output indicative of a comparison of the wheel slippage to a wheel slippage threshold value.

9. The mobile machine of claim 8, wherein the tire calibration system is:
   configured to receive the motor speed output, the articulation/steering angle output and the wheel slippage output, and determine the tire size differential across the plurality of ground-engaging elements and generate a tire size output indicative of the tire size differential.

10. The mobile machine of claim 9, wherein the tire calibration system is configured to determine a moving average speed of each motor, using the received motor speed outputs, and wherein the tire calibration system determines the tire size differential across the plurality of ground-engaging elements by comparing the moving average speed of each motor to the moving average speed of the other motors coupled to the plurality of ground-engaging elements.

11. The mobile machine of claim 9, wherein the tire calibration system is configured to receive the tire size output indicative of the tire size differential across the plurality of ground-engaging elements, determine motor operating parameters based on the tire size differential and generate action signals indicative of the determined motor operating parameters.

12. The mobile machine of claim 11, wherein the the plurality of motors are controlled based on the determined motor operating parameters.

13. A method of controlling a mobile machine, comprising:
   detecting an operating speed for each of a plurality of motors coupled to a ground-engaging element, having a tire, of the mobile machine based on speed signals received from a plurality of speed sensors, one speed sensor coupled to a corresponding motor;
   based on the operating speeds for each motor, generating a motor speed output indicative of the operating speed of each motor;
   detecting a wheel slippage for each of the ground-engaging elements of the mobile machine based on the speed signals received from the speed sensors;
   generating a wheel slippage output indicative of a comparison of the wheel slippage to a wheel slippage threshold value;
   detecting an articulation/steering angle of the mobile machine based on a sensor signal received from an angle sensor coupled to the mobile machine;
   generating an articulation/steering angle output indicative of a comparison of the articulation angle to an angle threshold value;
   determining, with one or more processors, a tire size differential indicative of differences in tire size for each tire of the plurality of ground-engaging elements based on the motor speed output, wheel slippage output and articulation/steering angle output; and generating separate motor control signals to control each of the plurality of motors based on the tire size differential.

14. The method of claim 13, further comprising:

determining control parameters for each of the plurality of motors coupled to the plurality of ground-engaging elements based on the tire size for each of the plurality of ground-engaging elements; and generating the separate motor control signals for each motor to operate the motor in accordance with the control parameters.

15. The method of claim 14, wherein determining the tire size for each tire comprises:

detecting that the wheel slippage and the articulation/steering angle are below the wheel slippage threshold value and the angle threshold value, respectively;

identifying a moving average speed of each motor based on the motor speed outputs;

comparing the moving average speed of one of the plurality of motors to the moving average speeds of the other of the plurality of motors on the mobile machine; and determining a tire size difference for each tire based on the comparison of the moving average speed of one of the plurality of motors to the moving average speeds of the other of the plurality of motors on the mobile machine.

16. The method of claim 13, wherein detecting the wheel slippage for each of the plurality of ground-engaging elements comprises:

receiving the speed signals from the speed sensors;

determining a motor torque for each of the plurality of motors based on the operating speeds and horsepower of each of the plurality of motors; and determining the wheel slippage for each ground-engaging element based on the motor torque and operating speed for each of the plurality of motors.

17. A mobile machine, comprising:

a plurality of ground-engaging elements that each comprises a tire;

a plurality of motors coupled to the plurality of ground-engaging elements, each one of the plurality of motors being configured to drive one of the plurality of ground-engaging elements;

a plurality of speed sensors, each configured to generate a speed signal indicative of a motor operating speed of one of the plurality of motors;

a tire calibration system, comprising one or more processors, configured to receive the speed signals, determine a moving average speed of each motor based on the speed signals, and determine a relative tire size of each of the tires relative to the other tires based on a comparison of the moving average speed of each of the plurality of motors to the other motors of the plurality of motor, wherein the plurality of motors are controlled based on the relative tire sizes.

18. The mobile machine of claim 17, wherein the tire calibration system is configured to:

detect a wheel slippage for the plurality of ground-engaging elements, and detect an articulation/steering angle for the mobile machine.

19. The mobile machine of claim 18, wherein the tire calibration system is configured to determine the relative tire size of the tires based on the wheel slippage, the articulation/steering angle and the comparison of the moving average speed of each of the plurality of motors to the other of the plurality of motors.

20. The mobile machine of claim 17, wherein the mobile machine comprises a wheel loader.

* * * * *